UNITED STATES PATENT OFFICE.

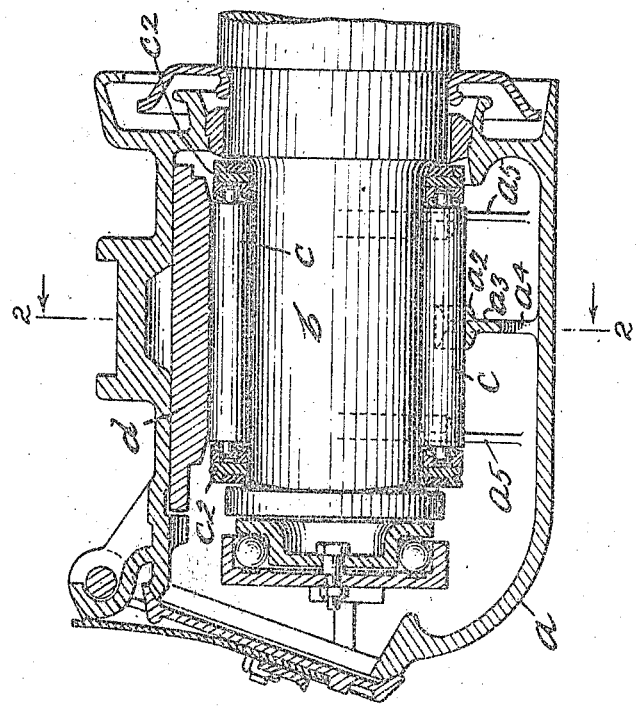

JULIUS AUGUSTUS PERKINS, OF NEW YORK, N. Y.

ROLLER-BEARING.

1,233,905.   Specification of Letters Patent.   Patented July 17, 1917.

Application filed April 13, 1914, Serial No. 831,389. Renewed December 13, 1916. Serial No. 136,815.

*To all whom it may concern:*

Be it known that I, JULIUS A. PERKINS, a citizen of the United States of America, and residing at New York, in the county of New York and State of New York, have invented certain new and useful Improvements in Roller-Bearings, of which the following is a specification, such as will enable those skilled in the art to which it appertains to make and use the same.

This invention relates to journal boxes provided with roller bearings for a journal therein, with particular reference to the bearing members for the rollers, and is a modification over the forms shown, described, and broadly claimed in my Letters Patent of the United States bearing date of September 5, 1911, No. 1,002,442, wherein bearing members, or tracks, are disclosed at an inclination to the central, vertical, longitudinal, plane of the box. It has been found that, while the forms therein shown possess certain advantages over the form herein shown, the cost of manufacture thereof has been excessive and the realinement of rollers, if moved out of alinement for any cause, is not as well accomplished as by the present form, as will be later explained.

My invention is fully described in the following specification, of which the accompanying drawings form a part, in which the separate parts are designated by the same reference characters in each of the views, and in which:—

Figure 1 is a longitudinal, central, section taken through a journal box constructed in accordance with my present invention, with journal and rollers in position;

Fig. 2 is a section taken on the line 2—2 of Fig. 1;

Figure 3:
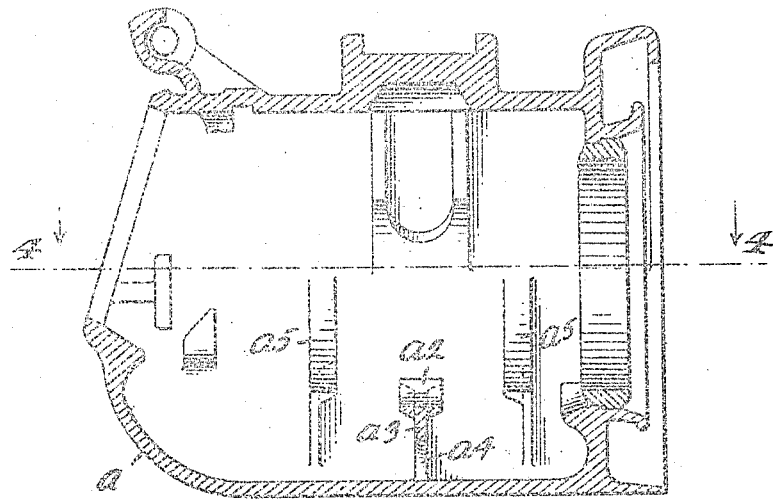
Fig. 3 is a view similar to Fig. 1 but with the journal and rollers removed.

In the drawings forming a part of this application I have shown a journal box $a$, having the journal of an axle $b$ therein surrounded by a series of rollers $c$ guided by a cage $c^2$, said box, in the form shown, having a detachable roller bearing block $d$ in the upper part thereof and as fully described in the patent referred to, but the particular form of this feature of the construction has no bearing on the present invention.

Figure 4:
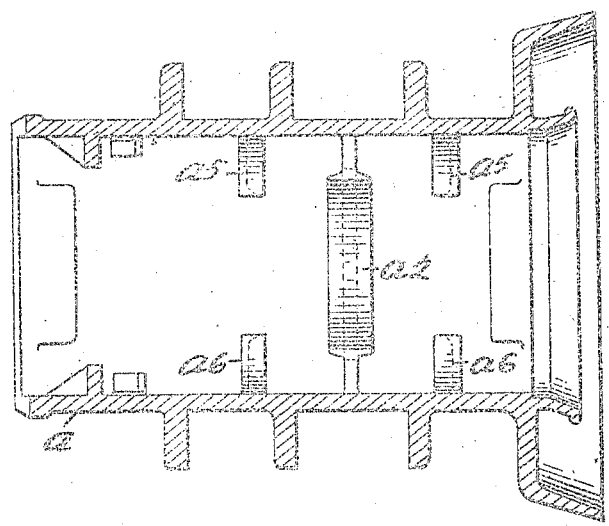
Fig. 4 is a section taken on the line 4—4 of Fig. 3.

Arranged in the bottom of the box, as clearly shown in Figs. 3 and 4, is a roller bearing track $a^2$ which is so located as to be in the central plane of the cage of rollers, said track being supported by a web $a^3$ having an opening $a^4$ therethrough for the passage of lubricants and, in view of the height of the said web, a refuse chamber is formed in the bottom of the box, but it will be noted that the track $a^2$ does not extend to the inner sides of the box.

Projecting from the sides of the box are two sets of tracks $a^5$ and $a^6$, the individual members of which are at or closely adjacent to the corresponding ends of the rollers $c$ and the individual tracks of each set are in exact line with the corresponding tracks of the other set and all of said tracks $a^5$ and $a^6$ extend an equal distance into the box interior whereby they overlap the corresponding ends of the track $a^2$, this being clearly shown in Fig. 4.

As shown in Fig. 2, all the tracks are concentric, or substantially so, to the journal $b$ but there is a slight excess of the radius of the arc of the tracks over the radius of the circle formed by the series of rollers in order that said rollers may be inserted within the bearing members, and this clearance forms an important part of the operating result in view of the possibility of radial movement of the rollers in the cage. When the rollers pass beneath the journal they clear the journal and rest upon the side tracks on the corresponding side of the box, this clearance from the journal being very gradual until each roller reaches the axial plane of the journal at which time there is full clearance therefrom and the particular roller at this point then rests upon the track $a^2$ which supports said roller at the exact center thereof, permitting vertical or lateral movement of the roller ends within the limits of the cage engagement, and any roller that had been moved out of alinement because of structural defects or inaccuracies, or because of foreign matter on either the rollers, journal, or bearing members, is permitted to realine itself previous to its upward planetary movement on the other side of the box.

As the rollers move into the lower central position the portion thereof between the side tracks is above the refuse chamber and any scale or other matter may fall therefrom into said chamber, and after the rollers reach the track $a^2$ and thereafter leave the side tracks the roller ends are free to clear themselves of scale or other matter, thus insuring a clearance of the full roller length not only from the journal but from the supporting tracks.

As the rollers above the journal support the load whatever clearance exists between the series of rollers and the lower part of the journal brings said rollers into an eccentric position with respect to the journal as they roll along the tracks and this feature is of importance in my bearing for the reason that as the rollers move upwardly they gradually become wedged between the journal and the side bearing members and they gradually begin to take the load as this upward movement continues until full load is carried above the journal.

In order to take full advantage of this gradual wedging effect it is essential that the roller ends be simultaneously engaged to prevent any twisting thereof in the cage, and this is one of the reasons that I arrange the side tracks parallel and of equal length, this result not being insured where the tracks are inclined as shown in the said patent for the reason that, in the latter form, the rollers are centrally supported at first and thereafter gradually toward their ends, permitting a slight twisting or displacement of the rollers not possible where the roller ends are simultaneously engaged by the side tracks.

Aside from the advantages of the present construction, already referred to, the cost of manufacture is greatly reduced as it is possible to make cores for the parallel track arrangement much more easily than for the inclined tracks, and to produce a commercial article the cost of manufacture thereof cannot be prohibitive as is possibly the case in the inclined tracks.

Having fully described my invention, what I claim as new, and desire to secure by Letters Patent, is:—

A journal box, a journal therein, an upper bearing member therein, rollers interposed between said journal and bearing member, and a lower bearing member, comprising relatively narrow supports at the ends of said rollers extending for a relatively short distance into said box, from each side thereof, at right angles to the axis of said box, and abruptly terminated upon lines perpendicular to the planes of said supports, whereby said rollers are maintained in positive alinement for the lengths of said supports, and a central support for said rollers to bridge the gap between opposite end supports, whereby said rollers may clear themselves of deleterious matter and re-aline themselves previous to the upward movement thereof.

In testimony that I claim the foregoing as my invention I have signed my name in presence of the subscribing witnesses this 10th day of April, 1914.

JULIUS AUGUSTUS PERKINS.

Witnesses:
ADELINE ELIZABETH PARKER,
J. C. LARSEN